(12) United States Patent
Steffen

(10) Patent No.: US 10,323,900 B1
(45) Date of Patent: Jun. 18, 2019

(54) CROSSBOW TRIPOD REST

(71) Applicant: Anthony Steffen, Festus, MO (US)

(72) Inventor: Anthony Steffen, Festus, MO (US)

( * ) Notice: Subject to any disclaimer, the term of this patent is extended or adjusted under 35 U.S.C. 154(b) by 0 days.

(21) Appl. No.: 15/967,681

(22) Filed: May 1, 2018

(51) Int. Cl.
*F41B 5/14* (2006.01)
*F16M 11/04* (2006.01)
*F41B 5/12* (2006.01)

(52) U.S. Cl.
CPC ......... *F41B 5/1453* (2013.01); *F16M 11/041* (2013.01); *F41B 5/12* (2013.01)

(58) Field of Classification Search
CPC .......... F41A 23/00; F41A 23/04; F41A 23/08; F41A 23/10; F41B 5/12; F41B 5/1453
See application file for complete search history.

(56) References Cited

U.S. PATENT DOCUMENTS

| | | | |
|---|---|---|---|
| 3,225,656 A * | 12/1965 | Flaherty | F41A 23/06 42/94 |
| 5,903,995 A * | 5/1999 | Brubach | F41A 23/06 42/90 |
| 5,974,719 A | 11/1999 | Simonek | |
| 6,272,785 B1 | 8/2001 | Mika | |
| 6,305,116 B1 * | 10/2001 | Parker | F41A 23/04 42/94 |
| 6,574,899 B1 | 6/2003 | Mostello | |
| D519,183 S | 4/2006 | Minneman | |
| 7,958,878 B2 | 6/2011 | Hoffmann | |
| 8,161,956 B2 | 4/2012 | Bednar | |
| 8,251,330 B2 * | 8/2012 | Stabler | F16M 11/16 211/184 |
| 8,745,913 B2 | 6/2014 | Hicks | |
| 9,310,153 B2 | 4/2016 | Nettleton | |
| 2015/0023656 A1 * | 1/2015 | Moody | F41A 23/08 396/428 |

FOREIGN PATENT DOCUMENTS

WO  2014190350  11/2014

* cited by examiner

*Primary Examiner* — John A Ricci
(74) *Attorney, Agent, or Firm* — Kyle A. Fletcher, Esq.

(57) ABSTRACT

The crossbow tripod rest is configured for use with a crossbow. The crossbow tripod rest is configured for use with a tripod. The tripod is further defined with a tripod head and a quick release plate. The quick release plate attaches the crossbow to the tripod head such that the tripod forms a load path that supports the weight of the crossbow above a supporting surface. The crossbow tripod rest comprises a cylindrical structure, a first quadric segment, a second quadric segment, and a plurality of shims. The first quadric segment and the second quadric segment are formed in the cylindrical structure. The plurality of shims secure the crossbow in the crossbow tripod rest.

18 Claims, 4 Drawing Sheets

CROSSBOW TRIPOD REST

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of weapons including bows and crossbows, more specifically, an accessory for arc shooting.

SUMMARY OF INVENTION

The crossbow tripod rest is configured for use with a crossbow. The crossbow tripod rest is configured for use with a tripod. The tripod is further defined with a tripod head and a quick release plate. The quick release plate attaches the crossbow to the tripod head such that the tripod forms a load path that supports the weight of the crossbow above a supporting surface. The crossbow tripod rest comprises a cylindrical structure, a first quadric segment, a second quadric segment, and a plurality of shims. The first quadric segment and the second quadric segment are formed in the cylindrical structure. The plurality of shims secure the crossbow in the crossbow tripod rest.

These together with additional objects, features and advantages of the crossbow tripod rest will be readily apparent to those of ordinary skill in the art upon reading the following detailed description of the presently preferred, but nonetheless illustrative, embodiments when taken in conjunction with the accompanying drawings.

In this respect, before explaining the current embodiments of the crossbow tripod rest in detail, it is to be understood that the crossbow tripod rest is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the crossbow tripod rest.

It is therefore important that the claims be regarded as including such equivalent construction insofar as they do not depart from the spirit and scope of the crossbow tripod rest. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
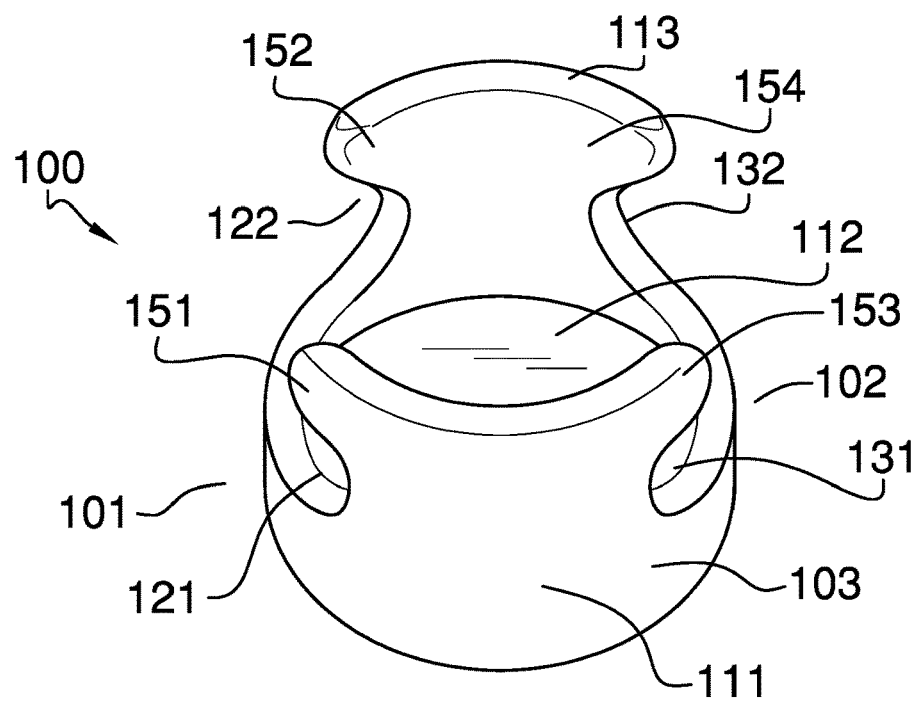
FIG. 1 is a perspective view of an embodiment of the disclosure.
Figure 2:
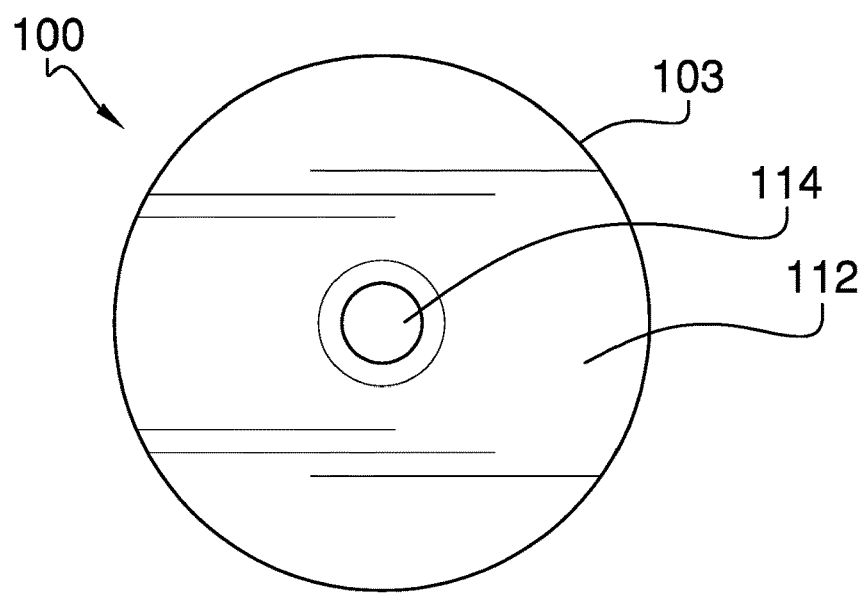
FIG. 2 is a bottom view of an embodiment of the disclosure.
Figure 3:
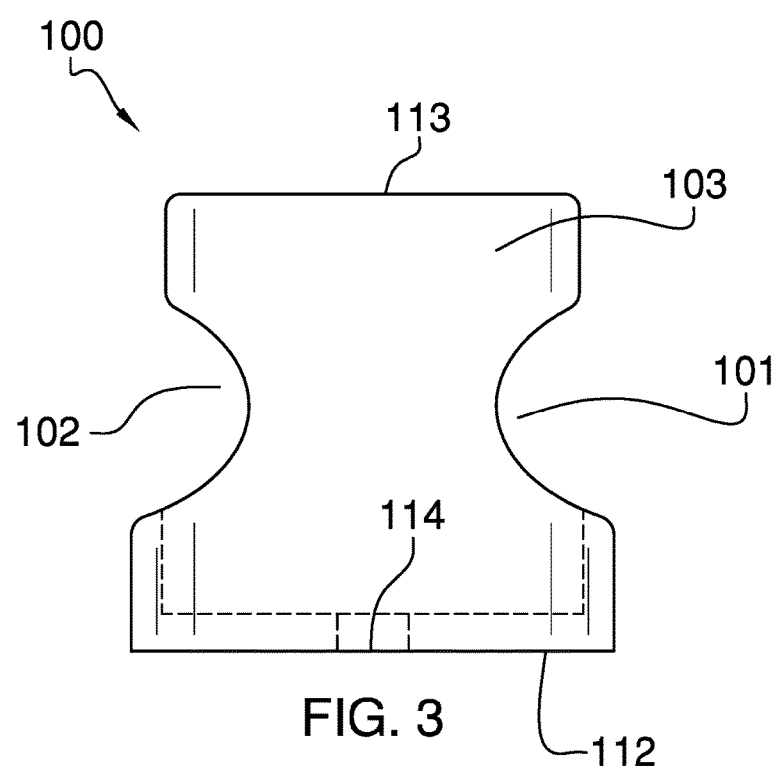
FIG. 3 is a side view of an embodiment of the disclosure.
Figure 4:
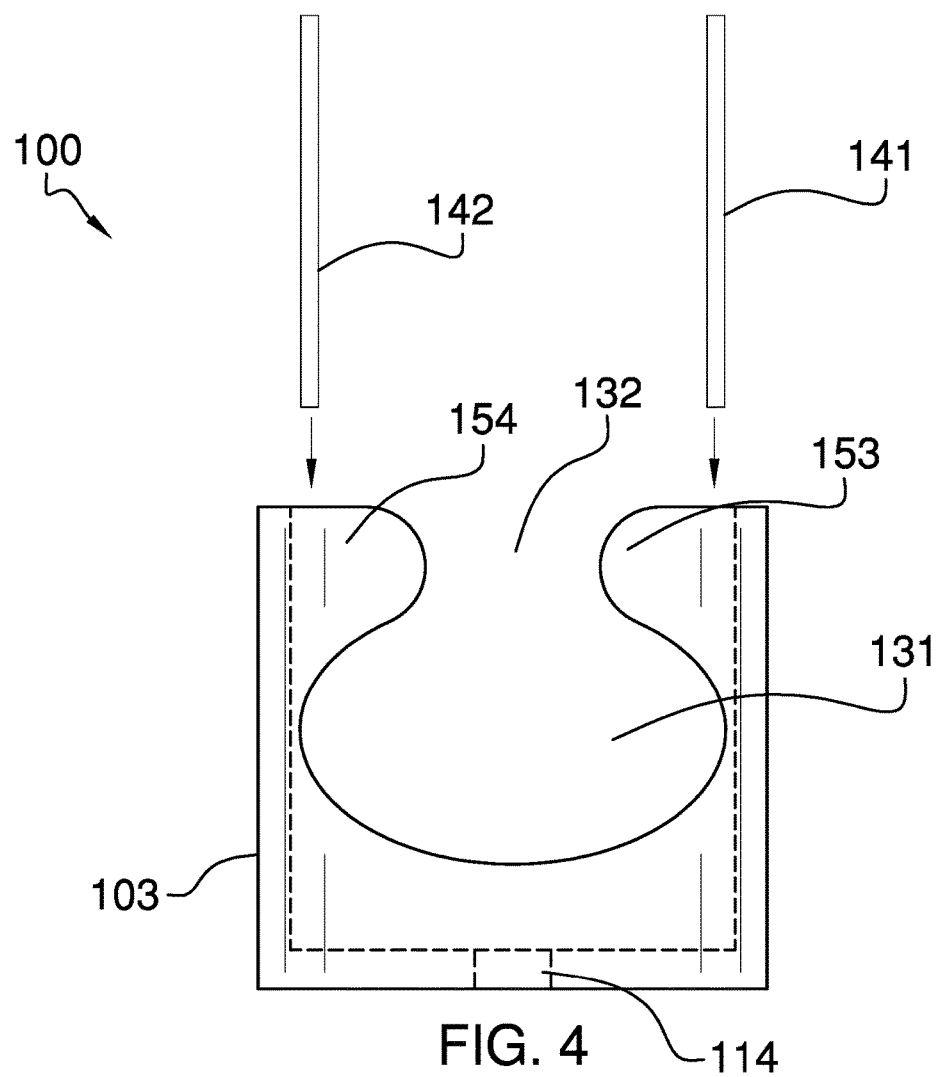
FIG. 4 is a front view of an embodiment of the disclosure.
Figure 5:
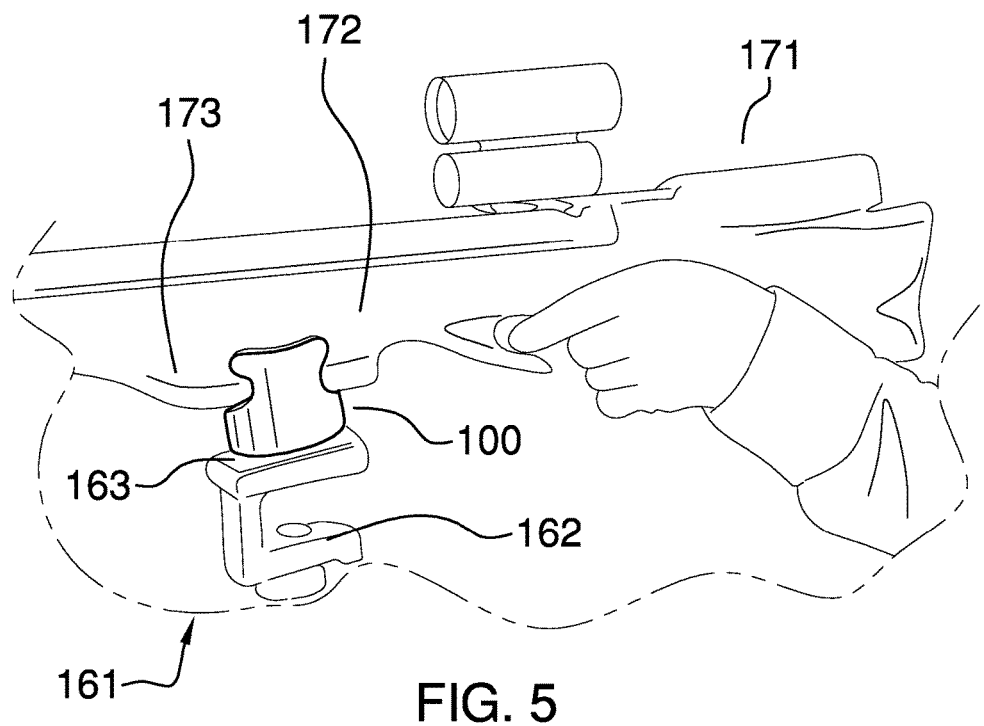
FIG. 5 is an in-use view of an embodiment of the disclosure.

Detailed reference will now be made to one or more potential embodiments of the disclosure, which are illustrated in FIGS. 1 through 5.

The crossbow tripod rest 100 (hereinafter invention) is configured for use with a crossbow 171. The crossbow 171 further comprises a forestock 172. The forestock 172 further comprises a finger rest 173. The invention 100 is configured for use with a tripod 161. The tripod 161 is further defined with a tripod 161 head 162 and a quick release plate 163. The quick release plate 163 attaches the crossbow 171 to the tripod head 162 such that the tripod 161 forms a load path that supports the weight of the crossbow 171 above a supporting surface. The invention 100 comprises a cylindrical structure 103, a first quadric segment 101, a second quadric segment 102, and a plurality of shims 104. The first quadric segment 101 and the second quadric segment 102 are formed in the cylindrical structure 103. The plurality of shims 104 secure the crossbow 171 in the invention 100.

The tripod 161 is defined in greater detail elsewhere in this disclosure. The tripod 161 head 162 is defined in greater detail elsewhere in this disclosure. The quick release plate 163 is defined in greater detail elsewhere in this disclosure. The crossbow 171 is a small arm that fires an arrow as a projectile. The forestock 172 is defined in greater detail elsewhere in this disclosure. The finger rest 173 is defined in greater detail elsewhere in this disclosure.

The cylindrical structure 103 is a capped tube. The cylindrical structure 103 attaches to the quick release plate 163 such that the quick release plate 163 will attach the cylindrical structure 103 to the tripod head 162 of the tripod 161. The forestock 172 of the crossbow 171 attaches to the cylindrical structure 103 such that the crossbow 171 secures to the tripod 161. The cylindrical structure 103 comprises a lateral face 111, a closed end 112, an open end 113, and a threaded plug 114.

The lateral face 111 refers to the surface of the cylindrical structure 103 that attaches the closed end 112 and the open end 113 of the cylindrical structure 103. The closed end 112 refers to the capped end of the capped tube structure of the cylindrical structure 103. The open end 113 refers to the end of the capped tube structure of the cylindrical structure 103 that is distal from the closed end 112. The lateral face 111, the closed end 112, the open end 113, and the capped tube are defined in greater detail elsewhere in this disclosure.

The closed end 112 further comprises a threaded plug 114. The threaded plug 114 is a cylindrical cavity that is formed in the exterior surface of the closed end 112 of the cylindrical structure 103. The center axis of the threaded plug 114 aligns with the center axis of the cylindrical structure 103. The interior surface of the threaded plug 114 is formed with an interior screw thread. The interior screw thread of the threaded plug 114 is sized to receive an exterior screw thread formed on the exterior surface of the tripod 161 stud of the tripod 161. The tripod 161 stud screws into the threaded plug 114 to attach the tripod 161 to the cylindrical structure 103.

The first quadric segment 101 is a first negative space formed in the lateral face 111 of the cylindrical structure 103. The first quadric segment 101 is formed the shape of a composite of different quadric surfaces. The first quadric segment 101 forms a concave space from the open end 113 of the cylindrical structure 103 into the lateral face 111 of the cylindrical structure 103 towards the closed end 112 of the cylindrical structure 103. The first quadric segment 101 comprises a first quadric space 121 and a first neck 122.

The first quadric space 121 is a negative space formed in the lateral face 111 of the cylindrical structure 103 that forms a component of the first quadric segment 101. The first quadric space 121 is formed in the shape of an ellipse such that the major axis of the ellipse that forms the first quadric space 121 is perpendicular to the center axis of the cylindrical structure 103.

The first neck 122 is a negative space formed in the lateral face 111 of the cylindrical structure 103 that forms a component of the first quadric segment 101. The first neck 122 is formed in the shape of a hyperbola such that the axis that bifurcates both branches of the hyperbola that forms the first neck 122 is perpendicular to the center axis of the cylindrical structure 103. The first neck 122 forms an opening that extends the first quadric space 121 to the open end 113 of the cylindrical structure 103. The first neck 122 forms a first hyoid 151 and a second hyoid 152 in the lateral face 111 of the cylindrical structure 103.

The first hyoid 151 is a solid portion of the lateral face 111 of the cylindrical structure 103 that projects into the negative space of the first neck 122. The first hyoid 151 forms the boundary of a first branch of the hyperbola that forms the first neck 122. The second hyoid 152 is a solid portion of the lateral face 111 of the cylindrical structure 103 that projects into the negative space of the first neck 122. The second hyoid 152 forms the boundary of a second branch of the hyperbola that forms the first neck 122.

The second quadric segment 102 is a second negative space formed in the lateral face 111 of the cylindrical structure 103. The second quadric segment 102 is formed the shape of a composite of different quadric surfaces. The second quadric segment 102 forms a concave space from the open end 113 of the cylindrical structure 103 into the lateral face 111 of the cylindrical structure 103 towards the closed end 112 of the cylindrical structure 103. The second quadric segment 102 forms a mirror image with the first quadric segment 101. The second quadric segment 102 is diametrically opposed to the first quadric segment 101 such that the forestock 172 of the crossbow 171 will fit into the cylindrical structure 103 between the first quadric segment 101 and the second quadric segment 102. The second quadric segment 102 comprises a second quadric space and a second neck 132.

The second quadric space 131 is a negative space formed in the lateral face 111 of the cylindrical structure 103 that forms a component of the second quadric segment 102. The second quadric space 131 is formed in the shape of an ellipse such that the major axis of the ellipse that forms the second quadric space 131 is perpendicular to the center axis of the cylindrical structure 103.

The second neck 132 is a negative space formed in the lateral face 111 of the cylindrical structure 103 that forms a component of the second quadric segment 102. The second neck 132 is formed in the shape of a hyperbola such that the axis that bifurcates both branches of the hyperbola that forms the second neck 132 is perpendicular to the center axis of the cylindrical structure 103. The second neck 132 forms an opening that extends the second quadric space 131 to the open end 113 of the cylindrical structure 103. The second neck 132 forms a third hyoid 153 and a fourth hyoid 154 in the lateral face 111 of the cylindrical structure 103.

The third hyoid 153 is a solid portion of the lateral face 111 of the cylindrical structure 103 that projects into the negative space of the second neck 132. The third hyoid 153 forms the boundary of a first branch of the hyperbola that forms the second neck 132. The fourth hyoid 154 is a solid portion of the lateral face 111 of the cylindrical structure 103 that projects into the negative space of the second neck 132. The fourth hyoid 154 forms the boundary of a second branch of the hyperbola that forms the second neck 132.

The first neck 122 and the second neck 132 are positioned relative to each other such that the first hyoid 151 and the second hyoid 152, will insert into the finger rest 173 of the forestock 172. The first neck 122 and the second neck 132 are positioned relative to each other such that the third hyoid 153 and the fourth hyoid 154 will insert into the finger rest 173 of the forestock 172.

Each of the plurality of shims 104 is a plastic rectangular strip. Each of the plurality of shims 104 forms a wedge that wedges between the forestock 172 of the crossbow 171 and the interior surface of the cylindrical structure 103 such that the crossbow 171 will not move within the cylindrical structure 103 as the crossbow 171 fires. In the first potential embodiment of the disclosure, the plurality of shims 104 comprises a first shim 141 and a second shim 142.

The first shim 141 is a plastic sheeting that is inserted between the forestock 172 of the crossbow 171 and the cylindrical structure 103 through the open end 113 of the cylindrical structure 103. The second shim 142 is a plastic sheeting that is inserted between the forestock 172 of the crossbow 171 and the cylindrical structure 103 through the open end 113 of the cylindrical structure 103. The second shim 142 is positioned diametrically opposed to the first shim 141 best immobilize the crossbow 171.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Exterior Screw Thread: An exterior screw thread is a ridge wrapped around the outer surface of a tube in the form of a helical structure that is used to convert rotational movement into linear movement.

Forestock: As used in this disclosure, the forestock is the part of a rifle that supports the barrel of the rifle. A forestock may also refer to the portion of other types of small arms that similarly located. Forestocks are often fitted with a finger rest. The finger rest is a groove formed in the forestock that provides a grip point for use by the fingers.

Hyperbola: As used in this disclosure, a hyperbola is a function that forms two branches when graphed in a plane. The equation of a hyperbola is $(x/a)^2-(y/b)^2=1$. The hyperbola is a conic section.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of length of the first arm roughly equals the span of length of the second arm. Hyoids generally have a U shaped appearance.

Interior Screw Thread: An interior screw thread is a groove formed around the inner surface of a tube in the form of a helical structure that is used to convert rotational movement into linear movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major axis axes refer to a pair of perpendicular axes that are defined within a structure. The length of the major axis is always greater than or equal to the length of the minor axis. The major and minor axes intersect at the center of the structure. The major axis is always parallel to an edge of a rectangular or rectilinear structure.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

Negative Space: As used in this disclosure, negative space is a method of defining an object through the use of open or empty space as the definition of the object itself, or, through the use of open or empty space to describe the boundaries of an object.

Quadric Surface: As used in this disclosure, a quadric surface is a three-dimensional surface that varies in the three Cartesian coordinates in an algebraically defined manner. The conic section is a two-dimensional embodiment of a quadric surface. Euclidian planes as well as the surfaces of ellipsoids, spheres, paraboloids, and cones are examples of quadric surfaces. The Euclidian plane is technically considered a degenerate form of a quadric surface but, unless specifically stated otherwise within this disclosure, is explicitly included in this definition. Quadric surfaces are described by the general algebraic form: $Ax^2+By^2+Cz^2+Dxy+Exz+Fyz+Gx+Hy+Iz+J=0$.

Quick Release Plate: As used in this disclosure, a quick release plate is an optional accessory for a tripod head. The quick release plate is a plate with a tripod stud that is attached to a device that can be attached to the tripod head using a latching system. The use of multiple quick release plates allows for rapidly and conveniently changing of the device mounted on the tripod.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rigid Structure: As used in this disclosure, a rigid structure is a solid structure formed from an inelastic material that resists changes in shape. A rigid structure will permanently deform as it fails under a force.

Screw: As used in this disclosure, to screw is a verb meaning: 1) to fasten or unfasten (unscrew) a threaded connection; or 2) to attach a helical structure to a solid structure.

Strip: As used in this disclosure, the term describes a long and narrow object of uniform thickness that appears thin relative to the length of the object. Strips are often rectangular in shape.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Tripod: As used in this disclosure, a tripod is a three-legged stand that is used to support a device.

Tripod Head: As used in this disclosure, a tripod head is the portion of the tripod that is attached to the device to the tripod. Modern tripod heads incorporate a ball head design that allows the orientation of the device to be adjusted and then locked into position. Tripod heads further comprise a standardized tripod stud, which is a standardized threaded connection that is used to connect the device to the tripod head.

Tube: As used in this disclosure, the term tube is used to describe a rigid hollow prism. While tubes that are suitable for use in this disclosure are often used to transport or conveys fluids or gases, the purpose of the tubes in this disclosure is structural. In this disclosure, the terms inner dimension and outer dimension of a tube are used as they would be used by those skilled in the plumbing arts.

Wedge: As used in this disclosure, a wedge is a structure that is inserted into a narrow opening, or fissure, for the purpose of: 1) separating the narrow opening; 2) placing the wedge tightly into the narrow opening for use as a lever; or, 3) placing the wedge tightly into the narrow opening for use in preventing movement.

Wedge: As used in this disclosure, to wedge is a verb that refers to forcing an object into a space that is slightly smaller than the object itself.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory for arc shooting comprising:
a cylindrical structure, a first quadric segment, a second quadric segment, and a plurality of shims;
wherein the first quadric segment and the second quadric segment are formed in the cylindrical structure;
wherein the accessory for arc shooting is configured for use with a crossbow;
wherein the crossbow further comprises a forestock;
wherein the forestock further comprises a finger rest;
wherein the plurality of shims secure the crossbow in the accessory for arc shooting;
wherein the accessory for arc shooting is configured for use with a tripod;
wherein the tripod is further defined with a tripod head and a quick release plate;
wherein the quick release plate attaches the crossbow to the tripod head such that the tripod forms a load path that supports the weight of the crossbow above a supporting surface;
wherein the forestock of the crossbow attaches to the cylindrical structure such that the crossbow secures to the tripod;
wherein the cylindrical structure attaches to the quick release plate such that the quick release plate will attach the cylindrical structure to the tripod head of the tripod;
wherein the cylindrical structure is a capped tube;
wherein the cylindrical structure comprises a lateral face, a closed end, an open end, and a threaded plug;
wherein the threaded plug is a cylindrical cavity formed in the exterior surface of the closed end of the cylindrical structure;
wherein the center axis of the threaded plug aligns with the center axis of the cylindrical structure.

2. The accessory for arc shooting according to claim 1
wherein the interior surface of the threaded plug is formed with an interior screw thread;
wherein the interior screw thread of the threaded plug is sized to receive an exterior screw thread formed on the exterior surface of a tripod stud of the tripod;
wherein the tripod stud screws into the threaded plug to attach the tripod to the cylindrical structure.

3. The accessory for arc shooting according to claim 2
wherein the first quadric segment is a first negative space formed in the lateral face of the cylindrical structure;
wherein the second quadric segment is a second negative space formed in the lateral face of the cylindrical structure.

4. The accessory for arc shooting according to claim 3
wherein the first quadric segment is formed the shape of a composite of quadric surfaces;
wherein the second quadric segment is formed the shape of a composite of quadric surfaces.

5. The accessory for arc shooting according to claim 4
wherein the first quadric segment forms a concave space from the open end of the cylindrical structure into the lateral face of the cylindrical structure towards the closed end of the cylindrical structure;
wherein the second quadric segment forms a concave space from the open end of the cylindrical structure into the lateral face of the cylindrical structure towards the closed end of the cylindrical structure.

6. The accessory for arc shooting according to claim 5 wherein the second quadric segment is diametrically opposed to the first quadric segment such that the forestock of the crossbow will fit into the cylindrical structure between the first quadric segment and the second quadric segment.

7. The accessory for arc shooting according to claim 6
wherein the first quadric segment comprises a first quadric space and a first neck;
wherein the first quadric space is a negative space formed in the lateral face of the cylindrical structure that forms a component of the first quadric segment;
wherein the first neck is a negative space formed in the lateral face of the cylindrical structure that forms a component of the first quadric segment.

8. The accessory for arc shooting according to claim 7 wherein the first quadric space is formed in the shape of an ellipse such that the major axis of the ellipse that forms the first quadric space is perpendicular to the center axis of the cylindrical structure.

9. The accessory for arc shooting according to claim 8 wherein the first neck is formed in the shape of a hyperbola such that the axis that bifurcates both branches of the hyperbola that forms the first neck is perpendicular to the center axis of the cylindrical structure.

10. The accessory for arc shooting according to claim 9 wherein the first neck forms an opening that extends the first quadric space to the open end of the cylindrical structure.

11. The accessory for arc shooting according to claim 10
wherein the second quadric segment comprises a second quadric space and a second neck;
wherein the second quadric space is a negative space formed in the lateral face of the cylindrical structure that forms a component of the second quadric segment;
wherein the second neck is a negative space formed in the lateral face of the cylindrical structure that forms a component of the second quadric segment.

12. The accessory for arc shooting according to claim 11 wherein the second quadric space is formed in the shape of an ellipse such that the major axis of the ellipse that forms the second quadric space is perpendicular to the center axis of the cylindrical structure.

13. The accessory for arc shooting according to claim 12 wherein the second neck is formed in the shape of a hyperbola such that the axis that bifurcates both branches of the hyperbola that forms the second neck is perpendicular to the center axis of the cylindrical structure.

14. The accessory for arc shooting according to claim 13 wherein the second neck forms an opening that extends the second quadric space to the open end of the cylindrical structure.

15. The accessory for arc shooting according to claim 14 wherein the second quadric surface is a mirror image of the first quadric surface.

16. The accessory for arc shooting according to claim 15
wherein the first neck forms a first hyoid and a second hyoid in the lateral face of the cylindrical structure;
wherein the first hyoid is a solid portion of the lateral face of the cylindrical structure that projects into the negative space of the first neck;
wherein the first hyoid forms the boundary of a first branch of the hyperbola that forms the first neck;
wherein the second hyoid is a solid portion of the lateral face of the cylindrical structure that projects into the negative space of the first neck;
wherein the second hyoid forms the boundary of a second branch of the hyperbola that forms the first neck;
wherein the second neck forms a third hyoid and a fourth hyoid in the lateral face of the cylindrical structure;
wherein the third hyoid is a solid portion of the lateral face of the cylindrical structure that projects into the negative space of the second neck;
wherein the third hyoid forms the boundary of a first branch of the hyperbola that forms the second neck;
wherein the fourth hyoid is a solid portion of the lateral face of the cylindrical structure that projects into the negative space of the second neck;
wherein the fourth hyoid forms the boundary of a second branch of the hyperbola that forms the second neck.

17. The accessory for arc shooting according to claim 16
wherein the first neck and the second neck are positioned relative to each other such that the first hyoid and the second hyoid, will insert into the finger rest of the forestock;
wherein the first neck and the second neck are positioned relative to each other such that the third hyoid and the fourth hyoid will insert into the finger rest of the forestock.

18. The accessory for arc shooting according to claim 17
wherein each of the plurality of shims is a plastic rectangular strip;
wherein each of the plurality of shims forms a wedge that wedges between the forestock of the crossbow and the interior surface of the cylindrical structure such that the crossbow will not move within the cylindrical structure as the crossbow fires.

* * * * *